(12) United States Patent
Suzuki et al.

(10) Patent No.: US 12,548,595 B2
(45) Date of Patent: Feb. 10, 2026

(54) MAGNETIC RECORDING APPARATUS COMPRISING DISK WITH REDUCED THICKNESS AND REDUCED DISK FLATNESS

(71) Applicant: Western Digital Technologies, Inc., San Jose, CA (US)

(72) Inventors: Shoji Suzuki, San Jose, CA (US); John Michael Bianchini, Los Altos, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 227 days.

(21) Appl. No.: 18/233,497

(22) Filed: Aug. 14, 2023

(65) Prior Publication Data

US 2023/0386516 A1 Nov. 30, 2023

Related U.S. Application Data

(62) Division of application No. 16/583,169, filed on Sep. 25, 2019, now abandoned.

(51) Int. Cl.
*G11B 5/73* (2006.01)
(52) U.S. Cl.
CPC .................. *G11B 5/73921* (2019.05)
(58) Field of Classification Search
CPC ..................................................... C23C 16/00
See application file for complete search history.

(56) References Cited

U.S. PATENT DOCUMENTS

| 5,141,778 A | 8/1992 | Yarkosky et al. |
| 6,086,949 A | 7/2000 | Hwang et al. |

(Continued)

FOREIGN PATENT DOCUMENTS

| CN | 1285949 A | 2/2001 |
| CN | 1925013 A | 3/2007 |

(Continued)

OTHER PUBLICATIONS

Kainuma, Kengo et al.; "Aluminum Substrate for 3.5-inch 1 TB Magnetic Recording Media"; Fuji Electric Review; Published 2011; vol. 57, No. 2; pp. 62-67. <https://www.fujielectric.com/company/tech/pdf/57-02/FER-57-2-062-2011.pdf>.

(Continued)

*Primary Examiner* — Michael B Cleveland
*Assistant Examiner* — Kristen A Dagenais
(74) *Attorney, Agent, or Firm* — LOZA & LOZA, LLP; Gabriel Fitch (57) ABSTRACT

A disk for a magnetic recording apparatus. The disk includes a substrate comprising a first surface and a second surface, wherein the substrate has a substrate thickness. The disk includes a first coating layer disposed over the first surface of the substrate, wherein the first coating layer has a first coating layer thickness. The disk includes a second coating layer disposed over the second surface of the substrate, wherein the second coating layer has a second coating layer thickness. The disk has a disk thickness, wherein the disk thickness includes the substrate thickness. The maximum thickness difference between the first coating layer thickness and the second coating layer thickness is a function of the square of the disk thickness.

18 Claims, 9 Drawing Sheets

(56) References Cited

U.S. PATENT DOCUMENTS

| | | | |
|---|---|---|---|
| 6,258,458 | B1 | 7/2001 | Awaya et al. |
| 6,299,947 | B1 | 10/2001 | Suzuki et al. |
| 6,316,097 | B1 | 11/2001 | Liu et al. |
| 6,482,505 | B1 | 11/2002 | Bertero et al. |
| 6,791,791 | B1 * | 9/2004 | Alfred ............... G11B 17/038 |
| 7,549,209 | B2 | 6/2009 | Wachenschwanz et al. |
| 8,940,419 | B2 | 1/2015 | Mukai |
| 9,297,078 | B2 | 3/2016 | Ishida et al. |
| 2003/0211361 | A1 | 11/2003 | Kim et al. |
| 2008/0131734 | A1 | 6/2008 | Tang et al. |
| 2011/0212346 | A1 | 9/2011 | Onoue et al. |
| 2017/0221513 | A1 | 8/2017 | Hiroi et al. |
| 2018/0012622 | A1 * | 1/2018 | Murase ............... G11B 5/4806 |
| 2019/0035424 | A1 | 1/2019 | Endo |
| 2019/0221233 | A1 | 7/2019 | Takahashi et al. |

FOREIGN PATENT DOCUMENTS

| | | |
|---|---|---|
| JP | H02267729 A | 11/1990 |
| JP | H03212817 A | 9/1991 |
| JP | H07296377 A | 11/1995 |
| JP | 08007251 A | 1/1996 |
| JP | H08007251 A | 1/1996 |
| JP | H11232631 A | 8/1999 |
| JP | 2006302358 A | 11/2006 |
| JP | 2011206666 A | 10/2011 |
| KR | 1020080073395 A | 8/2008 |
| WO | 2018/124262 A1 | 5/2018 |
| WO | 2019/004484 A1 | 1/2019 |

OTHER PUBLICATIONS

Tian, J. et al.; "NiP substrate CMP mechanism and technique of computer hard disk"; Jun. 2008; 55-59 <https://www.researchgate.net/publication/291647915_NiP_substrate_CMP_mechanism_and_technique_of_computer_hard_disk>.

Fuji Electric Co., Ltd.; "Fuji Electric Review: Magnetic Hard Disks;" Published 2000; vol. 46; ISSN 0429-8284; Whole No. 188; 40 pages. <https://www.fujielectric.com/company/tech_archives/pdf/46-01/FER-46-01-000-2000.pdf>.

JP2006302358 machine translation, accessed Sep. 24, 2019; 2 pages.

WO2019004484 machine translation, accessed Sep. 24, 2019; 10 pages.

International Search Report and Written Opinion for International Application No. PCT/US2020/038763, dated Jul. 6, 2021, 7 pages.

JPH08007251A machine translation, accessed Aug. 11, 2023; 3 pages.

"Young's Modulus-Tensile and Yield Strength for Common Materials", The Engineering ToolBox (2003); https:// www.engineeringtoolbox.com/young-modulus-d_417.html; 10 pages.

* cited by examiner

PLAN VIEW
FIG. 1

PROFILE VIEW
FIG. 2

FIG. 3

PROFILE VIEW
FIG. 4

PROFILE VIEW
FIG. 5

PROFILE VIEW
FIG. 6

FLATNESS DEVIATION PRIMARILY CAUSED BY
STRESS IMBALANCE FROM THICKNESS IMBALANCE /
DIFFERENCE OF COATING LAYERS

MAGNETIC RECORDING APPARATUS COMPRISING DISK WITH REDUCED THICKNESS AND REDUCED DISK FLATNESS

CROSS-REFERENCE TO RELATED APPLICATIONS

This application is a divisional of U.S. patent application Ser. No. 16/583,169, filed Sep. 25, 2019, entitled "MAGNETIC RECORDING APPARATUS COMPRISING DISK WITH REDUCED THICKNESS AND REDUCED DISK FLATNESS," the entire content of which is incorporated herein by reference as if fully set forth below in its entirety and for all applicable purposes.

FIELD

The present invention relates to a magnetic recording apparatus, and more particularly to a magnetic recording apparatus that includes a disk with reduced thickness and reduced disk flatness.

INTRODUCTION

Magnetic storage devices such as hard drive disks (HDDs) are storage devices that store data or information magnetically. High capacity HDDs often use multiple disks to store data. As the number of disks increases in the HDDs, the thickness of the disk(s) may be reduced in order to keep the size of the HDDs the same or smaller. However, a disk includes many different layers with many having different functions. Simply reducing the thickness of the disk introduces physical limitations and constraints that affect the performance of the disk, and in runny instances may prevent the disk from working property with the HDDs. As such, there is a need for HDDs that include disk(s) that have a reduced thickness, while maintaining and/or increasing the performance of the HDDs.

SUMMARY

A disk for a magnetic recording apparatus is provided. The disk includes a substrate comprising a first surface and a second surface, wherein the substrate has a substrate thickness. The disk includes a first coating layer disposed over the first surface of the substrate, wherein the first coating layer has a first coating layer thickness. The disk includes a second coating layer disposed over the second surface of the substrate, wherein the second coating layer has a second coating layer thickness. The disk has a disk thickness, wherein the disk thickness includes the substrate thickness. The maximum thickness difference between the first coating layer thickness and the second coating layer thickness is a function of the square of the disk thickness.

A magnetic storage device configured to store information is provided. The magnetic storage device includes a disk and a slider configured to glide over a surface of the disk. The disk includes a substrate comprising a first surface and a second surface, wherein the substrate has a substrate thickness. The disk includes a first coating layer disposed over the first surface of the substrate, wherein the first coating layer has a first coating layer thickness. The disk includes a second coating layer disposed over the second surface of the substrate, wherein the second coating layer has a second coating layer thickness. The disk has a disk thickness, wherein the disk thickness includes the substrate thickness. The maximum thickness difference between the first coating layer thickness and the second coating layer thickness is a function of the square of the disk thickness.

A method for fabricating a disk for a magnetic recording apparatus is provided. The method provides a substrate comprising a first surface and a second surface, wherein the substrate has a substrate thickness. The method forms a first coating layer over the first surface of the substrate, wherein the first coating layer has a first coating layer thickness. The method forms a second coating layer over the second surface of the substrate, wherein the second coating layer has a second coating layer thickness. The disk is fabricated such that the disk has a disk thickness, wherein the disk thickness includes the substrate thickness. The second coating layer is formed over the second surface such that the maximum thickness difference between the first coating layer thickness and the second coating layer thickness is a function of the square of the disk thickness.

BRIEF DESCRIPTION OF THE DRAWINGS

FIG. 10 (which includes FIGS. 10A-10B) illustrates an exemplary sequence of a process for fabricating a disk having reduced thickness and reduced flatness.

DETAILED DESCRIPTION

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The present disclosure describes a magnetic storage device (e.g., disk drive, hard disk drive) configured to store information. The magnetic storage device includes a disk and a slider configured to glide over a surface of the disk. The disk includes a substrate comprising a first surface and a second surface, wherein the substrate has a substrate thickness. The disk includes a first coating layer disposed over the first surface of the substrate, wherein the first coating layer has a first coating layer thickness. The disk includes a second coating layer disposed over the second surface of the substrate, wherein the second coating layer has a second coating layer thickness. The disk has a disk thickness, wherein the disk thickness includes the substrate thickness. A disk will usually have some flatness deviation. Specifying maximum flatness deviation of a disk helps ensure that there is not too much van between the highest point of the disk and the lowest point of the disk. Too much flatness deviation may cause the slider to deviate from the desired flying characteristics and/or even hit portions of the disk. The flatness deviation is related to the stress imbalance due to the differences in the thickness between the simultaneously-plated To layers (e.g., first coating layer and second coating layer) because the stress level in these two coating layers are typically the same. Thus, in order to ensure that the disk does not exceed a maximum flatness deviation, a difference between the first coating layer thickness and the second coating layer thickness must not exceed a maximum thickness difference. The maximum thickness difference between the first coating layer thickness and the second coating layer thickness is a function of the square of the disk thickness. In some implementations, the maximum thickness difference between the first coating layer thickness and the second coating layer thickness is a function of (i) the square of a first ratio that includes the substrate thickness, and (ii) a second ratio that includes the substrate Young's modulus value.

Exemplary Storage Device Havin Reduce Thickness Disk(s)

Figure 1:
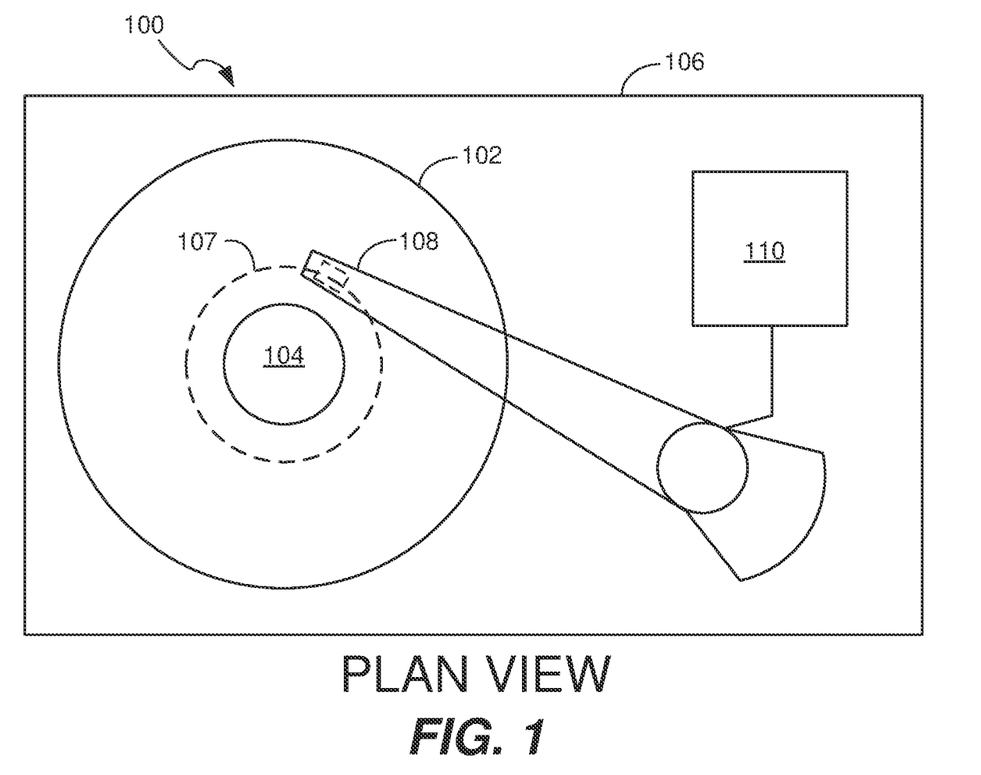
FIG. 1 illustrates a top plan view of a disk drive in accordance with an embodiment of the disclosure.

FIG. 1 illustrates a plan view of a disk drive 100 (e.g., hard disk drive) configured for using reduced thickness disks. The disk drive 100 may be a type of a magnetic storage device. The disk drive 100 includes one or more media 102 (e.g., disk), a spindle assembly 104, a drive housing 106, a slider 108 and a circuitry 110. The slider 108 may include a slider head. The slider 108 may be used to position the slider head. The one or more media 102 may be configured to store data. The media 102 may be a magnetic recording medium. The media 102 may be media disk. The media 102 may be a means for storing data. As will be further described below, the media 102 may be a reduced thickness media (e.g., reduced thickness disk) that satisfies certain conditions. The media 102 is positioned on the spindle assembly 104 that is mounted to the drive housing 106. Data may be stored along tracks in the magnetic recording layer of the media 102. The reading and writing of data are accomplished with a read element and a write element located with the slider 108. The write element is used to alter the properties of the magnetic recording layer of the media 102 and thereby write information thereto. In an implementation, the slider 108 may include an inductive read/write head or a Hall effect head.

During an operation of the disk drive 100, a spindle motor (not shown) rotates the spindle assembly 104, and thereby rotates the media 102. The slider 108 may be positioned over the media 102 at a particular location along a desired disk track 107. The positions of the slider 108, relative to the media 102 may be controlled by a position control circuitry 110. As the media 102 is rotating, the slider 108 may glide over the media 102

Figure 2:
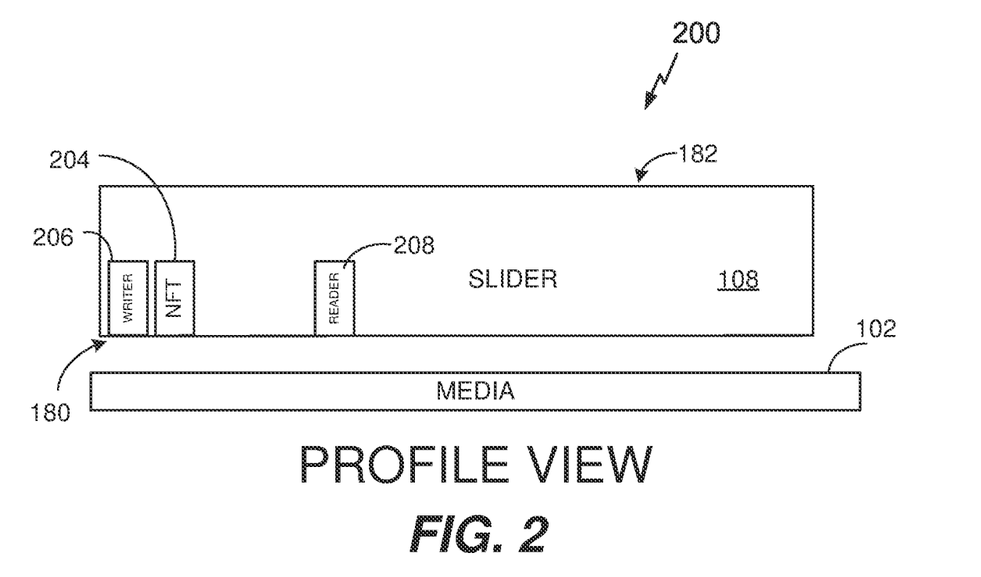
FIG. 2 illustrates a profile view of a slider and a disk in accordance with an embodiment of the disclosure.

FIG. 2 illustrates a profile view of the slider 108 and the media 102 of FIG. 1. In particular, FIG. 2 illustrates an assembly 200 that includes the slider 108, a near-field transducer (NET) 204 (if the head is a heat assisted magnetic recording (HAMR) head), a writer 206 and a reader 208. The NET 204 may be omitted in a non-HAMR head, and other components may be used instead in other types of energy assisted recording technology (e.g., a spin torque oscillator (STO) in a microwave assisted magnetic recording (MAMR) head). The assembly 200 is positioned over the media 102, The slider 108 may be one component or several components. The slider 108 may include a slider and a slider head. In some implementations, a slider head may be a separate component that may be integrated with the slider 108. The NET 204, the writer 206 and the reader 208 may be implemented in the slider, the slider head or combinations thereof.

The slider 108 includes a first surface 180 (e.g., bottom surface) that faces the media 102. The first surface 180 may be referred to as an air bearing surface (ABS). The slider 108 also includes a second surface 182 (e.g., top surface) that faces away from the media 102. The NET 204, the writer 206 and the reader 208 may be located near or along the first surface 180 of the slider 108. The writer 206 may be a writing element (e.g., means for writing data) for writing data on the media 102, and the reader 208 may be a reading element (e.g., means for reading data) for reading data on the media 102, The writer 206 may include a writing pole writer pole.

Figure 3:
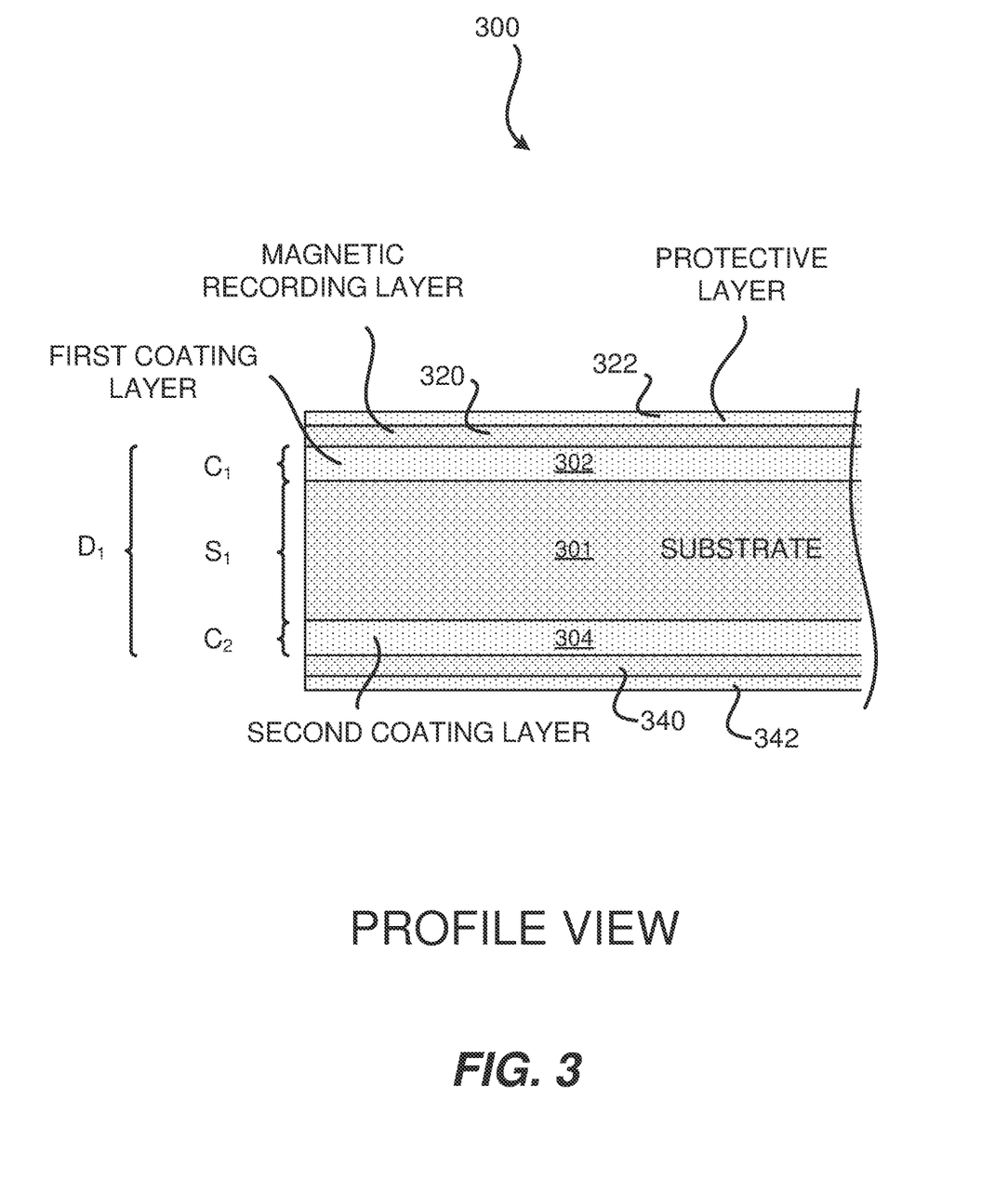
FIG. 3 illustrates a profile view of a disk in accordance with an embodiment of the disclosure.

FIG. 3 illustrates a close-up view of a disk 300. The disk 300 may be the media 102, as described in the disclosure. As shown in FIG. 3, the disk 300 includes a substrate 301, a first coating layer 302 that is disposed over a first surface of the substrate 301, a second coating layer 304 that is disposed over a second surface of the substrate 301, a first magnetic recording layer 320 disposed over the first coating layer 302, a second magnetic recording layer 340 disposed over the second coating layer 304, a first protective layer 322 disposed over the first magnetic recording layer 320, and a second protective layer 342 disposed over the second magnetic recording layer 340. In some implementations, the disk 300 may include only some of the layers described for FIG. 3. It is noted that the disk 300 may include other layers and/or components. The substrate 301 may include glass, aluminum, magnesium, zinc, and/or combinations thereof. The first coating layer 302 and the second coating layer 304 may each include nickel phosphorous (NiP). The first and second magnetic recording layers (e.g., 320, 340) may include cobalt-platinum (CoPt), iron-platinum (Feet) alloy, and/or combinations thereof. The first and second protective layers (e.g., 322, 342) may include carbon, diamond-like crystal, carbon with hydrogen and/or nitrogen doping, and/or combinations thereof.

The substrate 301 has a substrate thickness (S1), the first coating layer has a first coating layer thickness (C1), the second coating layer has a second coating layer thickness (C2). The disk thickness (D1) of the disk 300 may include the substrate (S), the first coating layer thickness (C1), and the second coating layer thickness (C2). However, it is noted that the disk thickness (D1) of the disk 300 may be defined differently. For example, in some implementations, the disk thickness (D1) of the disk 300 may include the thickness of the first magnetic recording layer 320, the second magnetic recording layer 340, the first protective layer 322 and/or the second protective layer 342.

Figure 4:
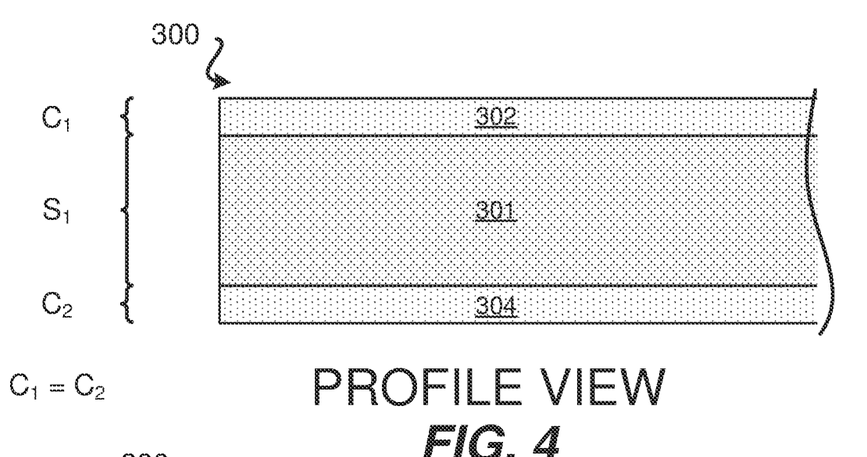
FIG. 4 illustrates a profile view of a disk in accordance with an embodiment disclosure.
Figure 5:
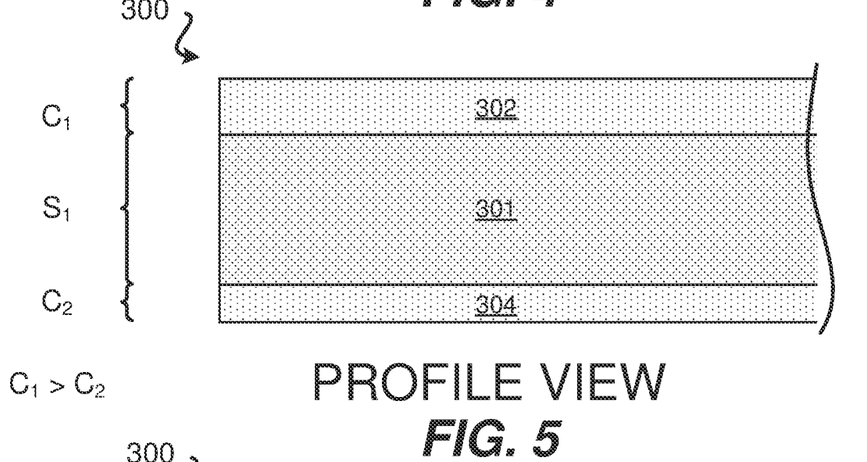
FIG. 5 illustrates a profile view of a disk in accordance with an embodiment of the disclosure.
Figure 6:
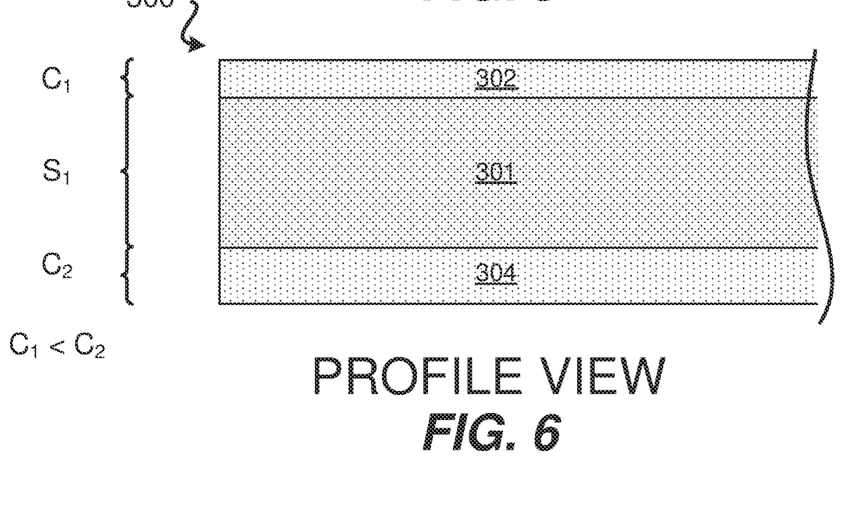
FIG. 6 illustrates a profile view of a disk in accordance with an embodiment of the disclosure.

FIGS. 4-6 illustrate examples of how the thickness difference of the coating layers (e.g., 302, 304) may vary from disk to disk. FIG. 4 illustrates an example of the disk 300 that includes the substrate 301, the first coating layer 302 and the second coating layer 304, where the first coating layer thickness (C1) is equal_ to the second coating layer thickness (C2). FIG. illustrates an example of the disk 300 that includes the substrate 301, the first coating layer 302 and the second coating layer 304, where the first coating layer thickness (C1) is greater than the second coating layer thickness (C2). FIG. 6 illustrates an example of the disk 300 that includes the substrate 301, the first coating layer 302 and the second coating layer 304, where the first coating layer thickness (C1) is less than the second coating layer thickness (C2).

Disk rigidity and disk flatness deviation (or disk flatness) are important properties of a disk, and providing a disk with a certain amount of disk rigidity and limiting the amount of flatness deviation is important. A minimum of disk rigidity helps ensure that the disk does not vibrate too much during operation (e.g., during spinning). The higher the disk rigidity, the lower the disk vibration. An acceptable disk flatness means that there are not much topographical variations, which adversely affect the head flying characteristics. A maximum flatness deviation helps ensure that there is not too much variation between the highest point of the disk and the lowest point of the disk. Too much flatness deviation may cause the slider to hit portions of the disk. Thus, as the disk thickness of a disk is reduced, the disk must still satisfy a minimum disk rigidity and the flatness deviation must be lower than the maximum allowable flatness deviation.

The disk rigidity of the disk may be controlled by the material(s) that is used for the substrate 301 and/or the coating layers (e.g., 302, 304). The disk flatness deviation (e.g., disk flatness) in a disk is primarily caused by a stress imbalance, which is proportional to the thickness imbalance (or thickness difference) in the coating layers (e.g., 302, 304) of the disk (e.g., 300). The higher the difference between the coating layers, the higher the stress imbalance, the higher the disk flatness deviation in the disk. Similarly, the lower the difference between the coating layers, the lower the stress imbalance, the lower the disk flatness deviation in the disk.

Figure 7:
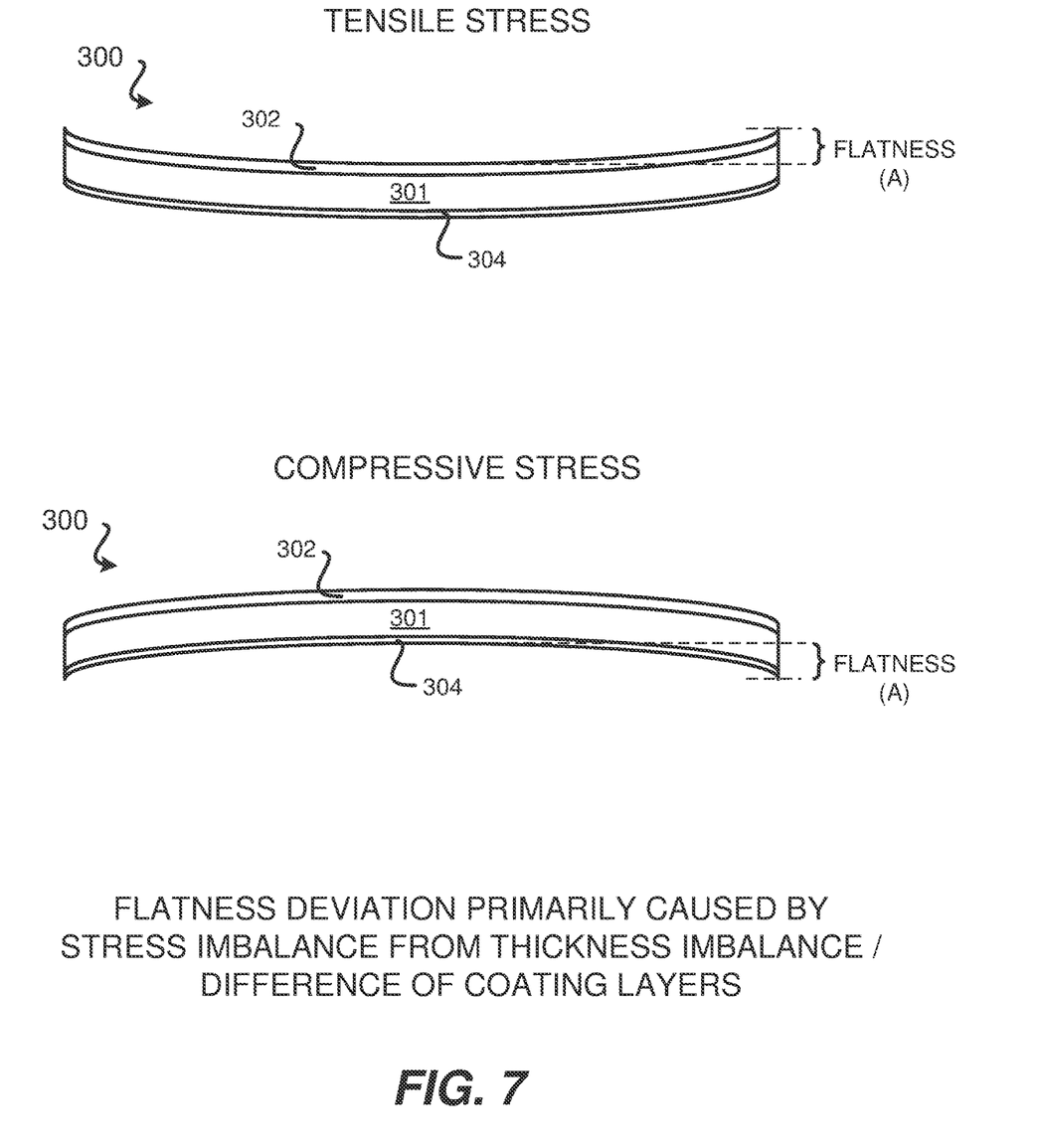
FIG. 7 illustrates profile views of a disk under stresses in accordance with an embodiment of the disclosure.

The internal stress within the coating layers is determined by the differences in thermal expansion rate (e.g., difference in coefficient of thermal expansion (CTE)) between the substrate 301 (e.g., Al—Mg material) and the coating layers (e.g., NiP) 302 and/or 304, Since the expansion rate of the coating layer (e.g., 302, 304) is less than the substrate 301 (e.g., compressive stress usually exists within the coating layers) 302, 304). FIG. 7 illustrates tensile stress and compressive stress in a disk 300 due to differences in the rate of expansion of the coating layer(s) (e.g., 302, 304) and the substrate 301. The tensile stress and the compressive stress cause the disk 300 to have a flatness (or flatness deviation) (A). This stress imbalance in the coating layer(s) 302 and/or 304 must be supported by the substrate 301 having a thick enough thickness. Therefore, a thinner substrate 301, would require a lower thickness difference between the first coating layer 302 and the second coating layer 304. Accordingly, as the disk thickness (D1) of the disk 300 gets thinner, the difference between the first coating layer thickness (C1) and the second coating layer thickness (C2) affect the flatness of the disk, and as such, it is important to control the thickness difference between the first coating layer thickness (C1) and the second coating layer thickness (C2). In some implementations, different disk thicknesses (D1) may have different tolerances (e.g., maximum thickness difference) for differences between the first coating layer thickness (C1) and the second coating layer thickness (C2). How to determine such thickness differences is further described below.

Determining the Maximum Thickness Difference Between Coating Layers for a Disk

Determining the maximum allowable thickness difference between coating layers for a specified disk thickness through experimentation may be a time-consuming process. Instead of performing time-consuming experimentations, a maximum allowable thickness difference between coating layers for a specified disk thickness may be determined by using the following equation or function:

$$MTD_1 = MTD_0 \times \left(\frac{D1}{D0}\right)^2 \times \frac{E1}{E0},  \quad \text{(Function 1)}$$

where $MTD_1$ is a maximum thickness difference between a first coating layer thickness and a second coating layer thickness for a disk (e.g., current disk, first disk), where $D_1$ is a disk thickness for the disk (e.g., current disk, first disk), where $E_1$ is a substrate Young's modulus value for a substrate (e.g., current substrate, first substrate) of the disk, where $E_0$ is a substrate Young's modulus value for a particular substrate (e.g., second substrate, another substrate, reference substrate), where $D_0$ is a disk thickness for a particular disk (e.g., second disk, another disk, reference disk) comprising the particular substrate (e.g., second substrate, another substrate, reference substrate), and where $MTD_0$ is a maximum thickness difference between a first particular coating layer thickness and a second particular coating layer thickness for the particular disk.

The above function illustrates that the maximum thickness difference ($MTD_1$) between the first coating layer thickness and the second coating layer thickness is a function of the square of the disk thickness. In particular, the above function, illustrates that the maximum thickness difference ($MTD_1$) between the first coating layer thickness and the second coating layer thickness is a function of (i) the square of a first ratio that includes the disk thickness ($D_1$), arid (ii) a second ratio that includes the substrate Young's modulus value ($E_1$). The numerator and the denominator of the various ratios will vary based on the properties and dimensions of the disk that is used as a reference disk and the desired disk (e.g., current disk).

The above equation or function is very useful when values are already known for certain disk thicknesses. For example, if the properties of a second disk and a second substrate are known, then the properties of a first disk, a first substrate and/or coating layer(s) may be determined by using the above function. The above equation may be used to ensure that for any desired or specified disk thickness, the disk 300 has a maximum flatness A (or maximum flatness deviation) of 20 micrometers (μm), which will help ensure that the disk 300 will work properly with an HDD.

It is noted that while Function 1 uses $D_1$ and $D_0$, in some implementations, $S_1$ and $S_0$ may be used instead of $D_1$ and $D_0$. Thus, in some implementations, for the purpose of the Function 1, $D_1$ equals $S_1$, and $D_0$ equals $S_0$, where $S_1$ is the substrate thickness for the substrate (e.g., current substrate, first substrate), and where $S_0$ is the substrate thickness for the particular substrate (e.g., another substrate, second substrate, reference substrate).

Different implementations may use different thicknesses for a disk. In some implementations, the disk 300 may have a thickness that is in a range of 0.2 millimeter (mm) and 1 millimeter (mm) (e.g., 0.38 mm, 0.5 mm, 0.6 mm, 0.635 mm, 0.8 mm and 1 mm). The Young's modulus value for a substrate may be in a range of 60-100 gigapascals (Gpa)

(e.g., 68 Gpa, 95 Gpa, 60-80 Gpa). In some implementations, in order to have enough rigidity, the first coating layer 302 and the second coating layer 304 may each have a thickness that is in a range of about 12-30 micrometers (μm). Having described exemplary materials and thicknesses for the disk 300 and the first and second coating layers (e.g., 302, 304), the use of the above function will be illustrated below in Table 1 and Table 2.

Table 1 illustrates how the maximum thickness difference between two coating layers can be determined for a disk in view of a reference disk.

|  | Disk Thickness (D) | Substrate Young's Modulus (E) | Maximum Thickness Difference (MTD) |
| --- | --- | --- | --- |
| Particular disk comprising a particular substrate | 0.635 mm ($D_0$) | 68 Gpa ($E_0$) | 0.7 μm ($MTD_0$) |
| Current Disk comprising a current substrate | 0.5 mm ($D_1$) | 68 Gpa ($E_1$) | 0.43 μm ($MTD_1$) |

Table 1 illustrates how the maximum thickness difference between two coating layers can be determined for a disk (e.g., current disk, first disk) if properties of another disk (e.g., second disk, reference disk) are already known. In this example, a particular disk comprising a particular substrate has a disk thickness of 0.635 mm ($D_0$), a substrate young's modulus of 68 Gpa ($E_0$), and a maximum thickness difference ($MTD_0$) between a particular first coating layer and a particular second coating layer, of 0.7 μm. Given this information, the maximum thickness difference ($MTD_1$) between two coating layers for a current disk (e.g., first disk) having a disk thickness 0.5 mm ($D_1$) and substrate Young's modulus of 68 Gpa ($E_1$), can be determined by using Function 1. In this example, the maximum thickness difference ($MTD_1$) is 0.43 μm.

As used in the disclosure, the term a "particular disk" may refer to any other disk that may be used as a point of reference for the current disk (e.g., first disk). A particular disk may be a reference disk, another disk or a second disk. A particular disk may be present in the same hard drive as the current disk or may be a prior iteration or a prior version of a disk. A particular disk may be located in a different hard drive than the current disk.

Similarly, as used in the disclosure, the term a "particular substrate" may refer to any other substrate that may be used as a point of reference for a current substrate. A particular substrate may be a reference substrate, another substrate or a second substrate. A particular substrate may be present in the same hard drive as the current substrate or may be a prior iteration or a prior version of a substrate. A particular substrate may be located in a different hard drive than the current substrate. A particular substrate may be part of the particular disk.

Table 2 illustrates how the maximum thickness difference between two coating layers can be determined for a disk in view of a reference disk.

|  | Disk Thickness (D) | Substrate Young's Modulus (E) | Maximum Thickness Difference (MTD) |
| --- | --- | --- | --- |
| Particular disk comprising a | 0.635 mm ($D_0$) | 68 Gpa ($E_0$) | 0.7 μm ($MTD_0$) |

Table 2 illustrates how the maximum thickness difference between two coating layers can be determined for a disk in view of a reference disk.

|  | Disk Thickness (D) | Substrate Young's Modulus (E) | Maximum Thickness Difference (MTD) |
| --- | --- | --- | --- |
| particular substrate Current Disk comprising a current substrate | 0.5 mm ($D_1$) | 95 Gpa ($E_1$) | 0.60 μm ($MTD_1$) |

Table 2 illustrates how the maximum thickness difference between two coating layers can be determined for a disk (e.g., current disk, first disk) if properties of another disk (e.g., second disk, reference disk) are already known. In this example, a particular disk comprising a particular substrate has a disk thickness of 0.635 mm ($D_0$), a substrate young's modulus of 68 Gpa ($E_0$), and a maximum thickness difference ($MTD_0$) between a particular first coating layer and a particular second coating layer, of 0.7 μm. Given this information, the maximum thickness difference ($MTD_1$) between two coating layers for a current disk (e.g., first disk) having a disk thickness 0.5 mm ($D_1$) and substrate Young's modulus of 95 Gpa. (F A), can be determined by using Function 1. In this example, the maximum thickness difference ($MTD_1$) is 0.60 μm.

Table 1 and Table 2 are merely examples of how the maximum thickness difference between coating layers may be determined as the disk thickness is reduced. The Function 1 can be used for any values and/or range in values, and is not limited to the values and/or range in values described in the disclosure.

Figure 8:
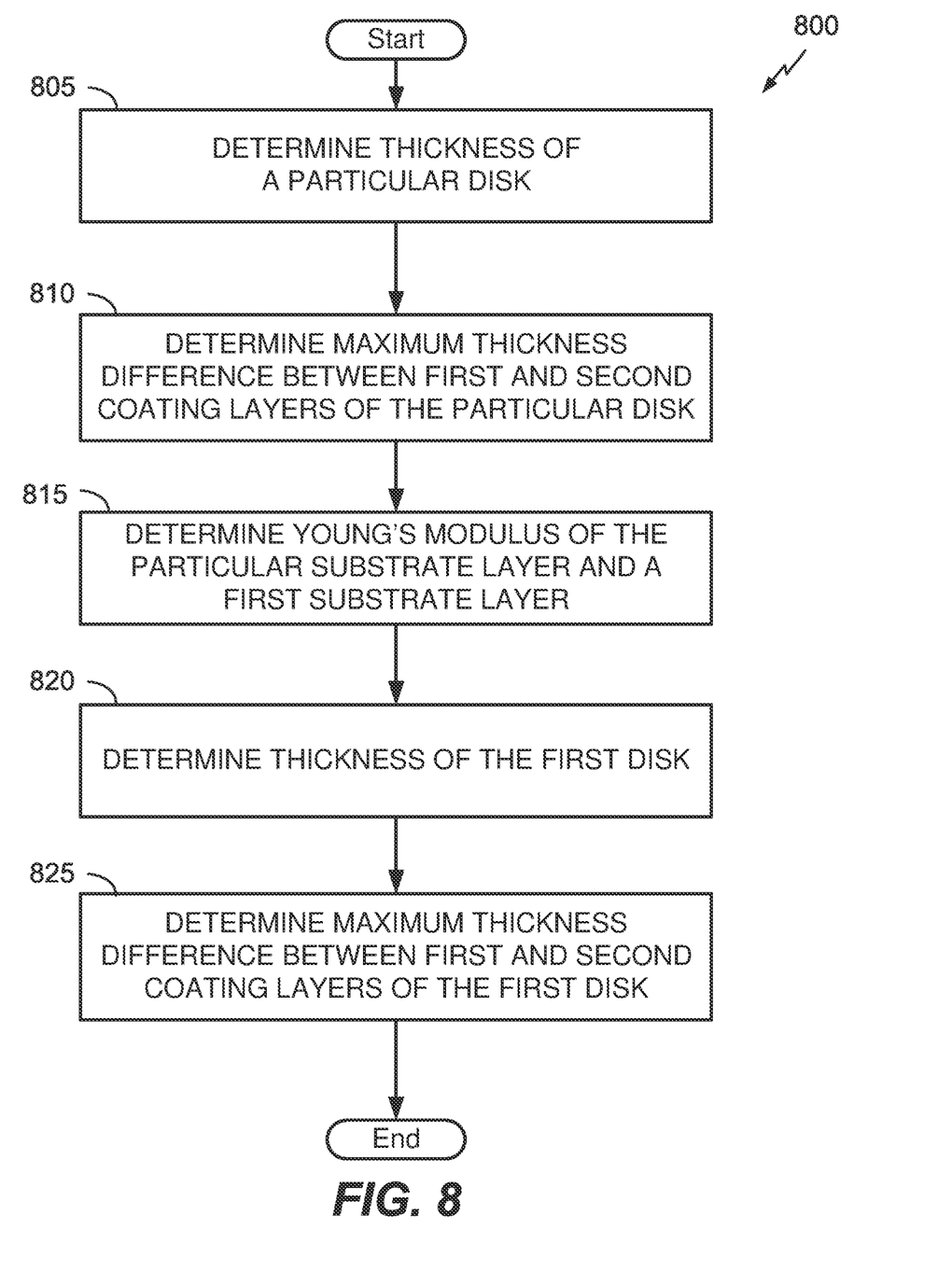
FIG. 8 illustrates an exemplary flow diagram of a method for determining a maximum thickness difference between two coating layers.

FIG. 8 illustrates an exemplary flow diagram of a method 800 for determining a maximum thickness difference between two coating layers. The method 800 of FIG. 8 may be used to determine the maximum thickness difference (e.g., $MTD_1$) of the first and second coating layers for any disk for a hard drive. It should be noted that the sequence of FIG. 8 may combine one or more processes in order to simplify and/or clarify the method for determining a maximum thickness difference between two coating layers. In some implementations, the order of the processes may be changed or modified.

The method determines (at 805) a thickness (e.g., Do) for a particular disk. The particular disk may be another disk (or second disk), where the properties and dimensions are already known. The particular disk may be a prior iteration or a prior version of a disk. The particular disk may be a reference disk. Examples of a particular disk are described in Table 1 and Table 2. The thickness (e.g., $D_0$) of the particular disk may be in a range of 1 millimeter and 0.2 millimeters.

The method determines (at 810) the maximum thickness difference (e.g., $MTD_0$) between a first particular coating layer and a second particular coating layer for the particular disk. In some implementations, the $MTD_0$ is already known and can be simply used. In some implementations, the $MTD_0$ may be calculated based on a maximum allowable flatness for the particular disk. The maximum allowable flatness may be a maximum allowable flatness deviation for the particular disk. The maximum allowable flatness deviation for the particular disk may be the maximum difference between the lowest and highest point in the particular disk.

In some implementations, the maximum allowable flatness deviation is 20 micrometers (μm).

The method determines (at 815) the substrate Young's modulus (e.g., $E_0$) for the particular substrate (e.g., second substrate, another disk) of the particular disk (e.g., second disk, another disk). Different implementations may use different substrate Young's modulus. The method also determines (at 815) the substrate Young's modulus (e.g., $E_1$) for the substrate (e.g., first substrate, current substrate) of the disk. (e.g., first disk, current disk). Examples of Young's modulus are described above in the disclosure.

The method determines (at 820) the thickness (e.g., $D_1$) of the disk (e.g., first disk, current disk). In some implementations, the thickness $D_1$) of the disk may be a thickness that is specified by industry standard. The thickness (e.g., $D_1$) of the disk may be in a range of 1 millimeter and 0.2 millimeters.

The method determines (at 825) the maximum thickness difference (e.g., $MTD_1$) between a first coating layer and a second coating layer for the disk (e.g., first disk, current disk). The Function 1 may be used to determine (e.g., calculate) the maximum thickness difference (e.g., $MTD_1$) between a first coating layer and a second coating layer for the disk. In determining the maximum thickness difference (e.g., $MTD_0$, the method 800 may use the thickness (e.g., $D_0$) of the particular disk, the $MTD_0$, and the substrate Young's modulus ($E_0$, $E_1$).

Once the maximum thickness difference (e.g., $MTD_1$) is determined, the thickness of the coating layers may be determined. Different implementations may use different thicknesses for the first and second coating layers (e.g., 302, 304). In some implementations, the first coating layer 302 and the second coating layer 304 may each have a thickness in a range of about 12-30 micrometers (μm).

Figure 9:
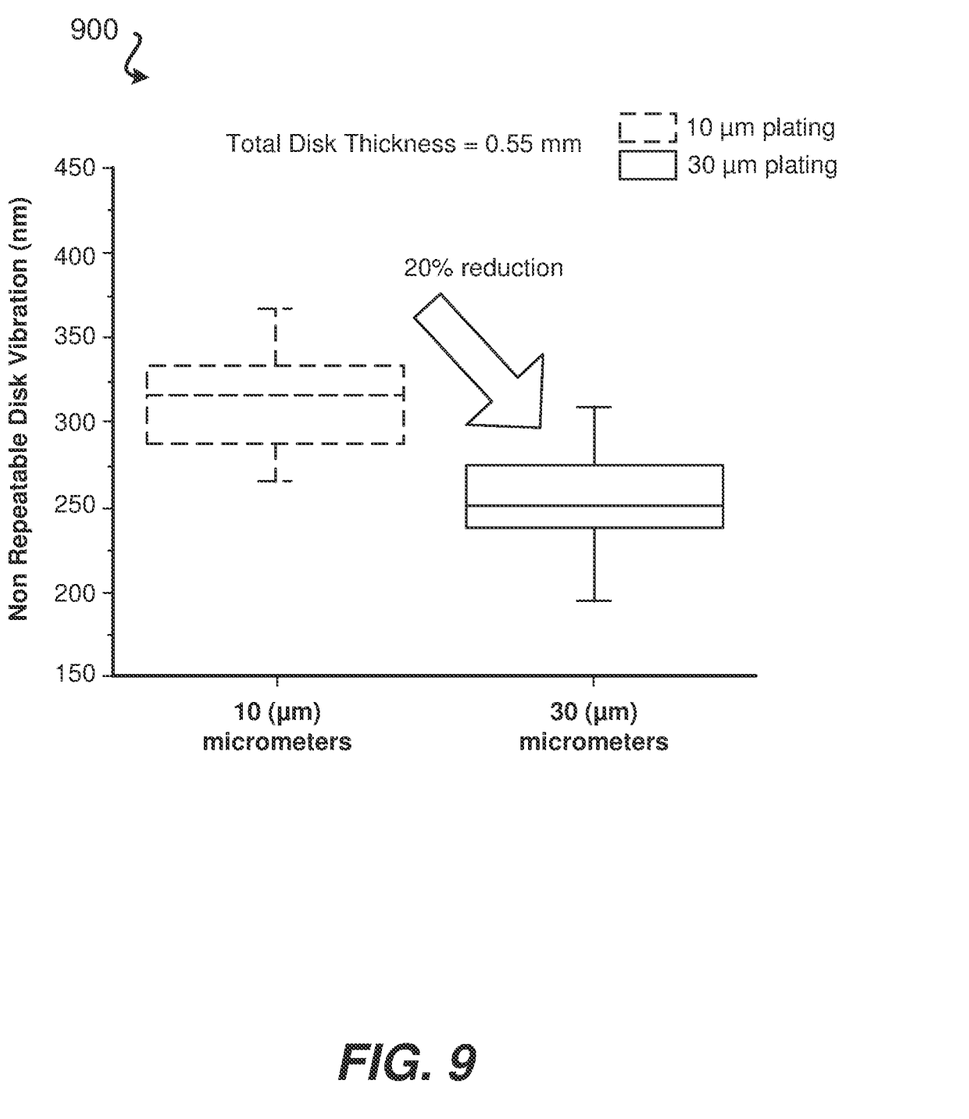
FIG. 9 illustrates a graph of how different plating thicknesses may affect a disk.

FIG. 9 illustrates a graph 900 that shows how using a thicker coating layer, while decreasing the overall thickness of the disk can help improve the non-repeatable disk vibrations. Ideally, tracks on a disk should be circular (due to the disk spinning about a spindle). However, non-repeatable disk vibrations will cause tracks on a disk to have non-circular shapes. The non-repeatable disk vibration value expresses the amount of deviation the track has from an ideal circular path. As shown in FIG. 9, for two disks having the same overall thickness of 0.55 millimeters, the disk that has a coating of 30 micrometers on each side, has a lower non-repeatable disk vibration than the disk that has a coating of 10 micrometers on each side. This indicates that in trying to reduce the overall thickness of the disk 300), in some implementations, it may make more sense to increase the overall thickness of the coating layers of the thinner disk.

Exemplary Sequence for Fabricating a Reduced Thickness Disk

Figure 10A:
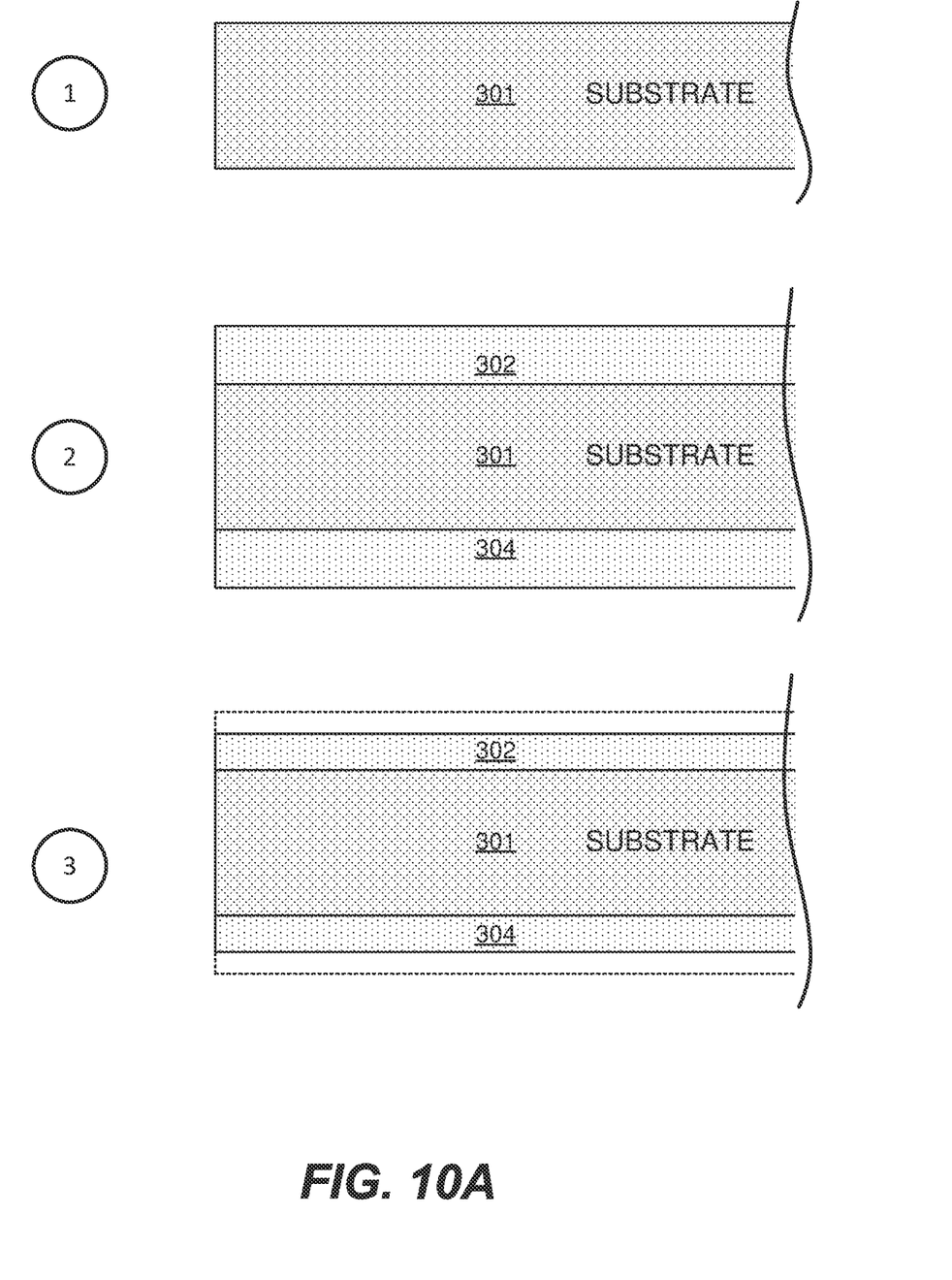
Figure 10B:
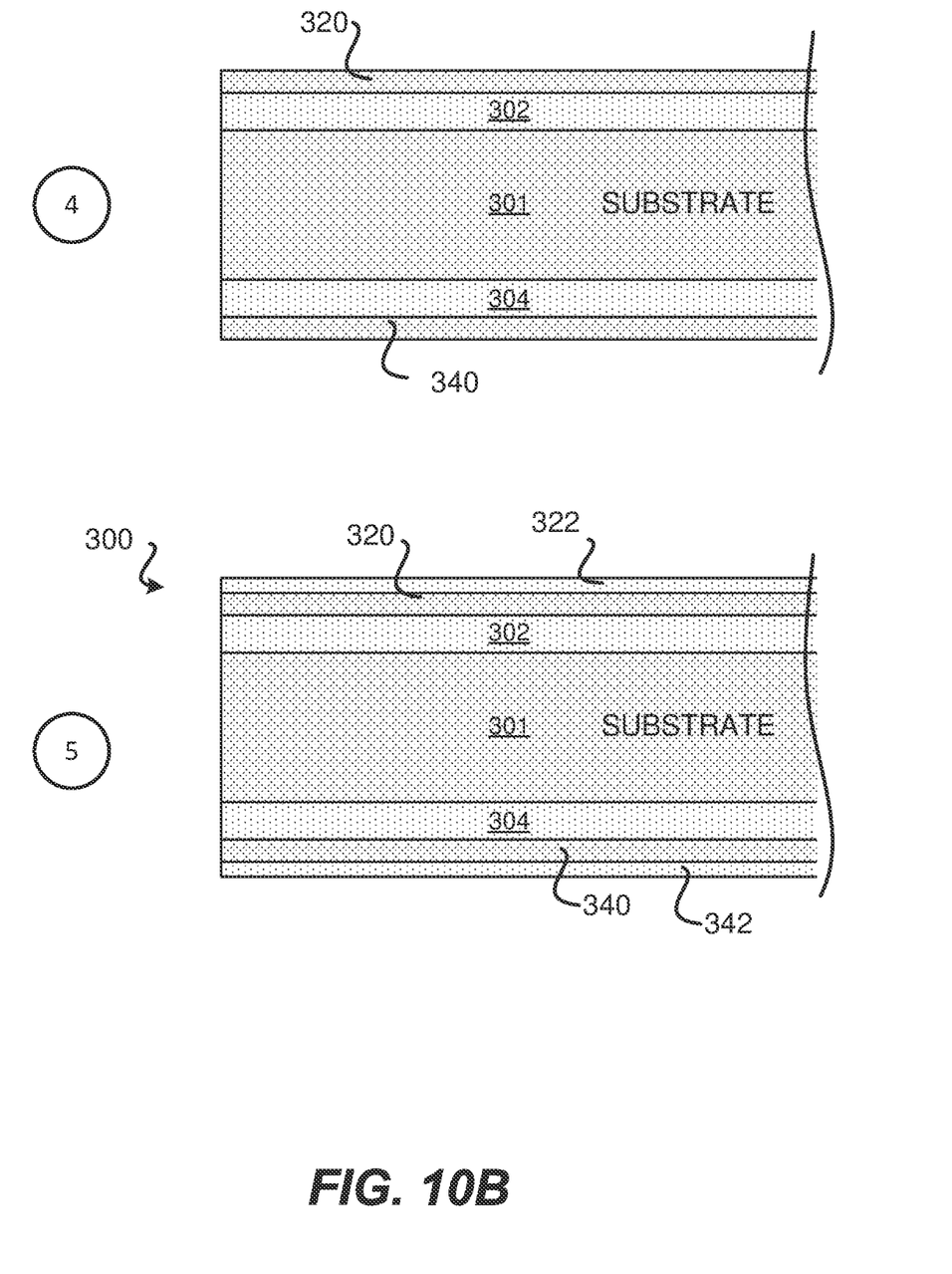

FIG. 10 (which includes FIGS. 10A-10B) illustrates an exemplary sequence for providing or fabricating a disk having a reduced thickness (e.g., a disk having a thickness in a range of 1 mm and 0.2 mm). In some implementations, the sequence of FIGS. 10A-1013 may be used to provide or fabricate any of the disks (e.g., 300) described in the disclosure.

It should be noted that the sequence of FIGS. 10A-1.0B may combine one or more stages in order to simplify and/or clarify the sequence for providing or fabricating the disk. In some implementations, the order of the processes may be changed or modified. In some implementations, one or more of processes may be replaced or substituted without departing from the spirit of the disclosure.

Stage 1, as shown in FIG. 10A, illustrates a state after a substrate 301 is provided. The substrate 301 may include glass, aluminum, magnesium, zinc, and/or combinations thereof. The thickness of the substrate 301 may be determined based on the thickness of the disk 300. For example, in some implementations, the thickness of the substrate 301 may be determined by subtracting the thickness of the coating layers (and thickness of the magnetic recording layer(s), thickness of the protective layer(s)) from the overall desired thickness of the disk. In some implementations, the substrate 301 may be etched, grinded or polished to a desired thickness.

Stage 2 illustrates a state after the first coating layer 302 is disposed over a first surface of the substrate 301, and a second coating layer 304 is disposed over a second surface of the substrate 301. The first coating layer 302 and the second coating layer 304 may each include nickel phosphorous (NiP). The first coating layer 302 may be formed over the first surface of the substrate 301 through a plating process. Similarly, the second coating layer 304 may be formed over the second surface of the substrate 301 through a plating process. The thickness of the first coating layer 302 and the second coating layer 304 that is disposed may be approximately close to the desired thickness (or slightly higher) for the disk. The first coating layer 302 and the second coating layer 304 may be disposed over the substrate 301 simultaneously.

Stage 3 illustrates a state after the first coating layer 302 and the second coating layer 304 have been polished, which reduces the thicknesses of the first coating layer 302 and the second coating layer 304. In some implementations, the polishing is done until the thickness difference between the first coating layer 302 and the second coating layer 304 is equal or less than the maximum thickness difference (e.g., $MTD_1$) as specified by Function 1. The polishing of the first coating layer 302 and the second coating layer 304 may be done concurrently or sequentially. One or more platens may be used to polish the first coating layer 302 and the second coating layer 304. The polishing may be done until a desired surface morphology, such as roughness and waviness, is achieved and surface defects are removed. In the meantime, the thickness difference between the two coating layers must be within the maximum specified by Function 1, which was described above. Polishing conditions are not intentionally designed to have thickness variations. Nonetheless, variations in the surface morphology may be generated during polishing.

Stage 4, as shown in FIGS. 10B, illustrates a state after a first magnetic recording layer 320 is disposed over the first coating layer 302, and a second magnetic recording layer 340 is disposed over the second coating layer 304. A plating process may be used to form the first magnetic recording layer 320 and the second magnetic recording layer 340.

Stage 5 illustrates a state after a first protective layer 322 is disposed over the first magnetic recording layer 320, and a second protective layer 342 is disposed over the second magnetic recording layer 340. Stage 5 may illustrate a disk 300 that includes the substrate 301, the first coating layer 302 that is disposed over a first surface of the substrate 301 the second coating layer 304 that is disposed over a second surface of the substrate 301, the first magnetic recording layer 320 disposed over the first coating layer 302, the second magnetic recording layer 340 disposed over the second coating layer 304, the first protective layer 322 disposed over the first magnetic recording layer 320, and the second protective layer 342 disposed over the second magnetic recording layer 340.

Exemplary Flow Diagram of a Method for Fabricating a Reduced Thickness Disk

Figure 11:
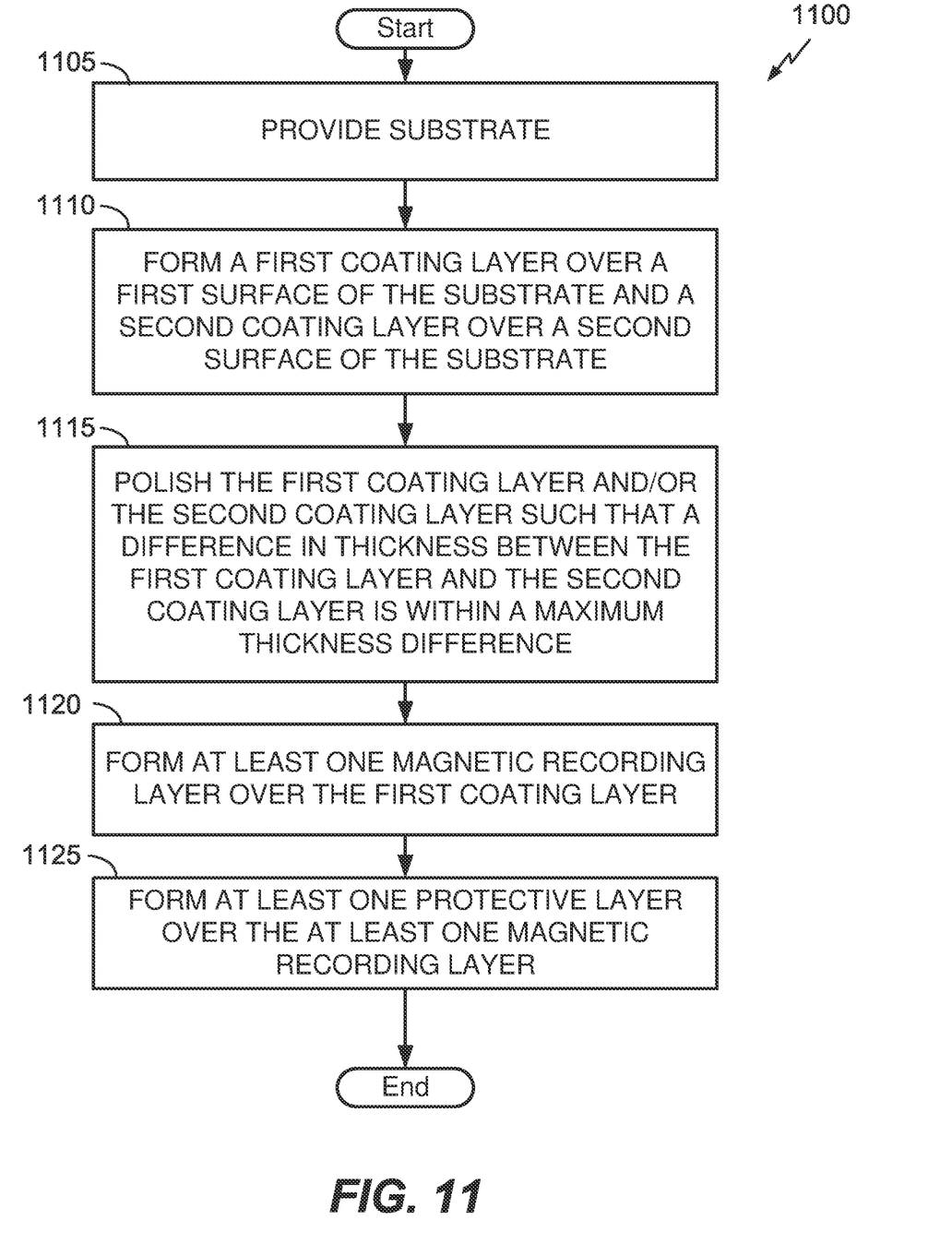
FIG. 11 illustrates an exemplary flow diagram of a method for fabricating a disk having reduced thickness and reduced flatness.

In some implementations, fabricating a reduced thickness disk includes several processes. FIG. 11 illustrates an exemplary flow diagram of a method 1100 for providing or fabricating a reduced thickness disk (e.g., a disk having a thickness in a range of 1 mm and 0.2 mm), The method 1100 of FIG. 11 may be used to provide or fabricate any of the disks (e.g., 300) described in the disclosure.

It should be noted that the sequence of FIG. 11 may combine one or more processes in order to simplify and/or clarify the method for providing or fabricating a reduced thickness disk. In some implementations, the order of the processes may be changed or modified.

The method provides (at 1105) a substrate 301. The substrate 301 may include glass, aluminum, magnesium, zinc, and/or combinations thereof. The thickness of the substrate 301 may be determined based on the thickness of the disk 300. For example, in some implementations, the thickness of the substrate 301 may be determined by subtracting the thickness of the coating layers (and thickness of the magnetic recording layer(s), thickness of the protective layer(s)) from the overall desired thickness of the disk. In some implementations, the substrate 301 may be etched, grinded or polished to a desired thickness.

The method forms (at 1110) a first coating layer 302 over a first surface of the substrate 301. The first coating layer 302 may include nickel phosphorous (NiP). The first coating layer 302 may be formed over the first surface of the substrate 301 through a plating process. The thickness of the first coating layer 302 that is formed over the first surface of the substrate 301 may be approximately close to the desired thickness (or slightly higher) for the disk.

The method also forms (at 1110) a second coating layer 304 over a second surface of the substrate 301. The second coating layer 304 may include nickel phosphorous (NiP). The second coating layer 304 may be formed over the second surface of the substrate 301 through a plating process. The thickness of the second coating layer 304 that is formed over the second surface of the substrate 301 may be approximately close to the desired thickness (or slightly higher) for the disk. The first coating layer 302 and the second coating layer 304 may be formed over the substrate 301 concurrently.

The method polishes (at 1115) the first coating layer 302 and the second coating layer 304, which reduces the thicknesses of the first coating layer 302 and the second coating layer 304. In some implementations, the polishing is done until the thickness difference between the first coating layer 302 and the second coating layer 304 is equal or less than the maximum thickness difference (e.g., $MTD_1$) as specified by Function 1. The polishing of the first coating layer 302 and the second coating layer 304 may be done concurrently or sequentially. One or more platens may be used to polish the first coating layer 302 and the second coating layer 304. The polishing may be done until a desired surface morphology, such as roughness and waviness, is achieved and surface defects are removed. In the meantime, the thickness difference between the two coating layers must be within the maximum specified by Function 1, which was described above. Polishing conditions are not intentionally designed to have thickness variations. Nonetheless, variations in the surface morphology may be generated during polishing.

The method forms (at 1120) a first magnetic recording layer 320 over the first coating layer 302. In some implementations, the method may form (at 1125) a second magnetic recording layer 340 over the second coating layer 304.

A plating process may be used to form the first magnetic recording layer 320 and the second magnetic recording layer 340.

The method forms (at 1125) a first protective layer 322 over the first magnetic recording layer 320. In some implementations, the method may form (at 1130) a second protective layer 342 over the second magnetic recording layer 340, In some implementations, after the forming of the coating layers, the magnetic recording layer(s) and the protective layer(s), the method has fabricated a disk 300 that includes the substrate 301, the first coating layer 302 that is disposed over a first surface of the substrate 301, the second coating layer 304 that is disposed over a second surface of the substrate 301, the first magnetic recording layer 320 disposed over the first coating layer 302, the second magnetic recording layer 340 disposed over the second coating layer 304, the first protective layer 322 disposed over the first magnetic recording layer 320, and the second protective layer 342 disposed over the second magnetic recording layer 340. The disk 300 may have a thickness that satisfies the condition of Function 1.

It shall be appreciated by those skilled in the art in view of the present disclosure that although various exemplary fabrication methods are discussed herein with reference to magnetic recording disks, the methods, with or without some modifications, may be used for fabricating other types of recording disks, for example, optical recording disks such as a compact disc (CD) and a digital-versatile-disk (DVD), or magneto-optical recording disks, or ferroelectric data storage devices.

Various components described in this specification may be described as "including" or made of certain materials or compositions of materials. In one aspect, this can mean that the component consists of the particular material(s). In another aspect, this can mean that the component comprises the particular material(s).

The word "exemplary" is used herein to mean "serving as an example, instance, or illustration," Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another even if they do not directly physically touch each other. It is further noted that the term "over" as used in the present application in the context of one component located over another component, may be used to mean a component that is on another component and/or in another component (e.g., on a surface of a component or embedded in a component). Thus, for example, a first component that is over the second component may mean that (1) the first component is over the second component, but not directly touching the second component, (2) the first component is on (e.g., on a surface of) the second component, anti/or (3) the first component is in (e.g., embedded in) the second component. The term "about 'value X'", or "approximately value X", as used in the disclosure shall mean within 10 percent of the 'value X.' For example, a value of about 1 or approximately 1, would mean a value in a range of 0.9-1.1. In the disclosure various ranges in values may be specified, described and/or claimed. It is noted that any time a range is specified, described and/or claimed in the specification and/or claim, it is meant to include the endpoints (at least in one embodiment). In another embodiment, the range may not include the endpoints of the range.

What is claimed is:

1. A method for fabricating a disk for use in a hard disk drive, the method comprising:
    selecting an allowable flatness deviation for a new disk to be fabricated;
    obtaining a reference disk configured for use in the hard disk drive, the reference disk having a substrate with a thickness ($S_0$), a first nickel-phosphorous (NiP) coating directly on a first surface of the substrate, a second NiP coating directly on an opposing second surface of the substrate, and a flatness deviation less than the allowable flatness deviation;
    determining a thickness difference ($TD_0$) between a thickness of the first NiP coating and a thickness of the second NiP coating of the reference disk;
    providing a substrate for the new disk that has a substrate thickness ($S_1$) and a diameter that is the same as a diameter of the reference disk;
    determining a thickness difference ($TD_1$) for the new disk between a first NiP coating to be applied to a first surface of the substrate of the new disk and a second NiP coating to be applied to a second, opposing surface of the new disk, wherein the thickness difference ($TD_1$) for the new disk is determined based, at least in part, on a function that includes multiplying the thickness difference ($TD_0$) of the reference disk by the square of $S_1$ divided by the square of $S_0$;
    forming the first NiP coating directly on the first surface of the substrate of the new disk; and
    forming the second NiP coating directly on the second surface of the substrate of the new disk;
    wherein a difference in thickness between the first and second NiP coatings of the new disk ($TD_1$) is less than the thickness difference ($TD_0$) for the reference disk.

2. The method of claim 1, wherein the substrate of the reference disk and the substrate of the new disk comprise the same material.

3. The method of claim 1, wherein the substrate of the reference disk and the substrate of the new disk comprise a material selected from the group consisting of magnesium, zinc, glass and combinations thereof.

4. The method of claim 1, wherein the substrate of the reference disk and the substrate of the new disk comprise Al-Mg.

5. The method of claim 1,
    wherein the substrate of the reference disk has a substrate Young's modulus value $E_0$;
    wherein the substrate of the new disk has a substrate Young's modulus value $E_1$; and
    wherein the thickness difference ($TD_1$) for the new disk is further determined based, at least in part, on a dimensionless ratio of $E_1$ to $E_0$.

6. The method of claim 5, wherein the thickness difference ($TD_1$) for the new disk is further determined as a function of $$TD_0 \times \left(\frac{S_1}{S_0}\right)^2 \times \frac{E_1}{E_0}.$$

7. The method of claim 1, wherein an expansion rate of the first and second coatings of the reference disk is less than an expansion rate of the substrate of the reference disk, and wherein an expansion rate of the first and second coatings of the new disk is less than an expansion rate of the substrate of the new disk.

8. The method of claim 1, further comprising forming a magnetic recording layer over the first coating, wherein the magnetic recording layer is configured to store information.

9. The method of claim 1, wherein the reference disk is a prior iteration of the new disk.

10. The method of claim 1, wherein $S_1$ is 0.5 millimeters (mm).

11. The method of claim 10, wherein the first and second NiP coatings of the new disk each have a thickness in the range of 12-30 micrometers (μm).

12. The method of claim 10, wherein the substrate thickness ($S_1$) for the new disk is less than the substrate thickness ($S_0$) of the reference disk.

13. A method for fabricating a disk for use in a hard disk drive, the method comprising:
    selecting an allowable flatness deviation for a new disk to be fabricated;
    obtaining a reference disk configured for use in the hard disk drive, the reference disk having a substrate with a thickness ($S_0$), a first coating on a first surface of the substrate, a second coating on an opposing second surface of the substrate, and a flatness deviation less than the allowable flatness deviation;
    determining a thickness difference ($TD_0$) between a thickness of the first coating and a thickness of the second coating of the reference disk;
    providing a substrate for the new disk that has a substrate thickness ($S_1$) and a diameter that is the same as a diameter of the reference disk;
    determining a thickness difference ($TD_1$) for the new disk between a first coating to be applied on a first surface of the substrate of the new disk and a second coating to be applied on a second, opposing surface of the new disk, wherein the thickness difference ($TD_1$) for the new disk is determined based, at least in part, on a function that includes multiplying the thickness difference ($TD_0$) of the reference disk by the square of $S_1$ divided by the square of $S_0$;
    forming the first coating comprising nickel-phosphorous (NiP) on the first surface of the substrate of the new disk; and
    forming the second coating comprising NiP on the second surface of the substrate of the new disk;
    wherein a difference in thickness between the first and second coatings of the new disk ($TD_1$) is less than the thickness difference ($TD_0$) for the reference disk.

14. A method for fabricating a disk for use in a hard disk drive, the method comprising:
    obtaining a reference disk configured for use in the hard disk drive, the reference disk having a substrate with a thickness ($S_0$), a first coating on a first surface of the substrate, a second coating on an opposing second surface of the substrate;
    determining a thickness difference ($TD_0$) between a thickness of the first coating and a thickness of the second coating of the reference disk;
    providing a substrate for a new disk to be fabricated that has a substrate thickness ($S_1$) and a diameter that is the same as a diameter of the reference disk;
    determining a thickness difference ($TD_1$) for the new disk between a first coating to be applied on a first surface of the substrate of the new disk and a second coating to be applied on a second, opposing surface of the new disk, wherein the thickness difference ($TD_1$) for the new disk is determined based, at least in part, on a function that includes multiplying the thickness difference ($TD_0$) of the reference disk by the square of S1 divided by the square of So;

forming the first coating comprising nickel-phosphorous (NiP) on the first surface of the substrate of the new disk; and forming the second coating comprising NiP on the second surface of the substrate of the new disk;

wherein a difference in thickness between the first and second coatings of the new disk ($TD_1$) is less than the thickness difference ($TD_0$) for the reference disk.

15. The method of claim 14, wherein the substrate of the reference disk has a substrate Young's modulus value $E_0$;

wherein the substrate of the new disk has a substrate Young's modulus value $E_1$; and wherein the thickness difference ($TD_1$) for the new disk is further determined based, at least in part, on a dimensionless ratio of $E_1$ to $E_0$.

16. The method of claim 15, wherein the thickness difference ($TD_1$) for the new disk is further determined as a function of $$TD_0 \times \left(\frac{S_1}{S_0}\right)^2 \times \frac{E_1}{E_0}.$$

17. The method of claim 14, wherein an expansion rate of the first and second coatings of the reference disk is less than an expansion rate of the substrate of the reference disk, and wherein an expansion rate of the first and second coatings of the new disk is less than an expansion rate of the substrate of the new disk.

18. The method of claim 14, wherein $S_1$ is 0.5 millimeters (mm), and wherein the first and second NiP coatings of the new disk each have a thickness in the range of 12-30 micrometers (μm).

* * * * *